2 Sheets--Sheet 1.
W. O. WAKEFIELD.
Water-Meters.
No. 130,610. Patented Aug 20, 1872.
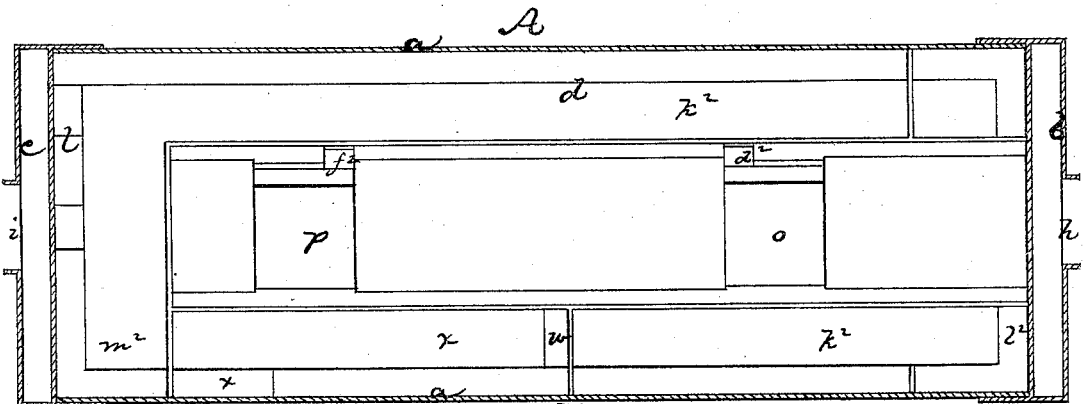
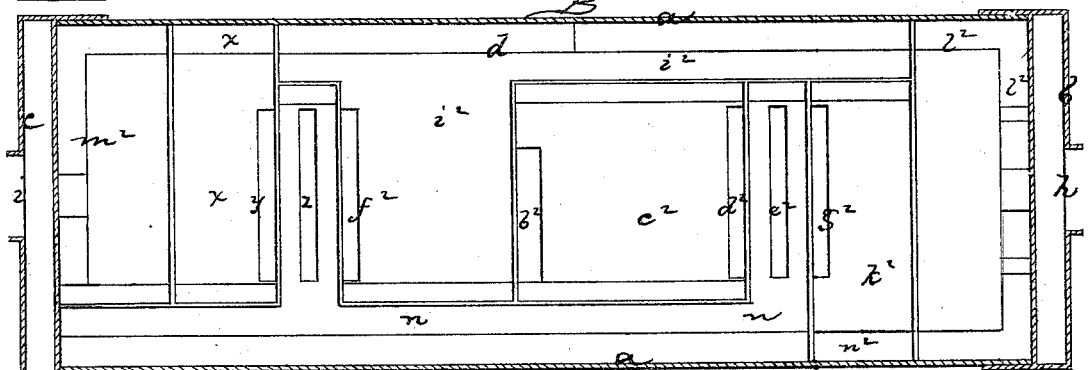
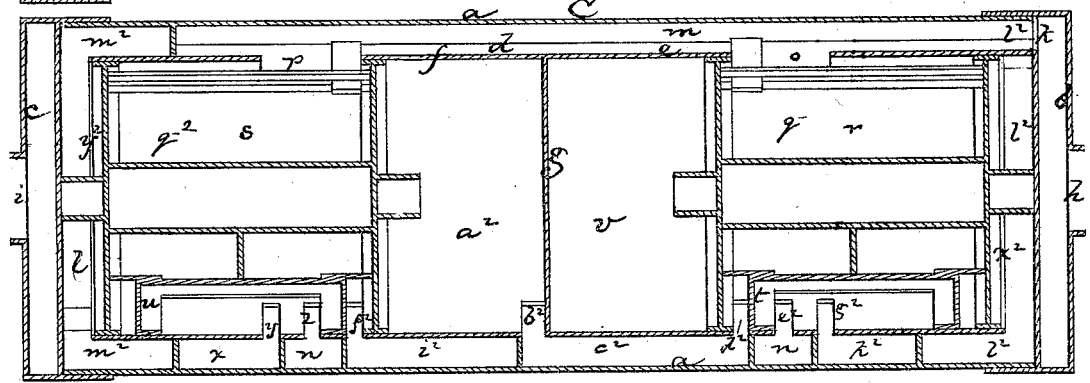
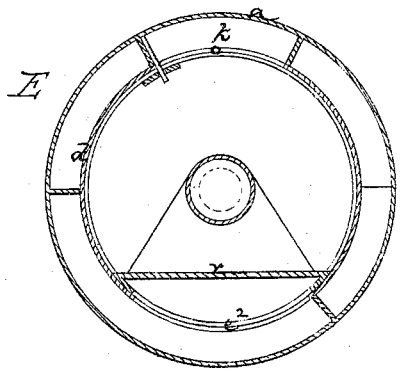
Witnesses.
S. B. Kidder.
M. W. Frothingham.
Inventor.
William O. Wakefield.
By his Attys
Crosby & Gould 2 Sheets--Sheet 2.
W. O. WAKEFIELD.
Water-Meters.
No. 130,610. Patented Aug. 20, 1872.
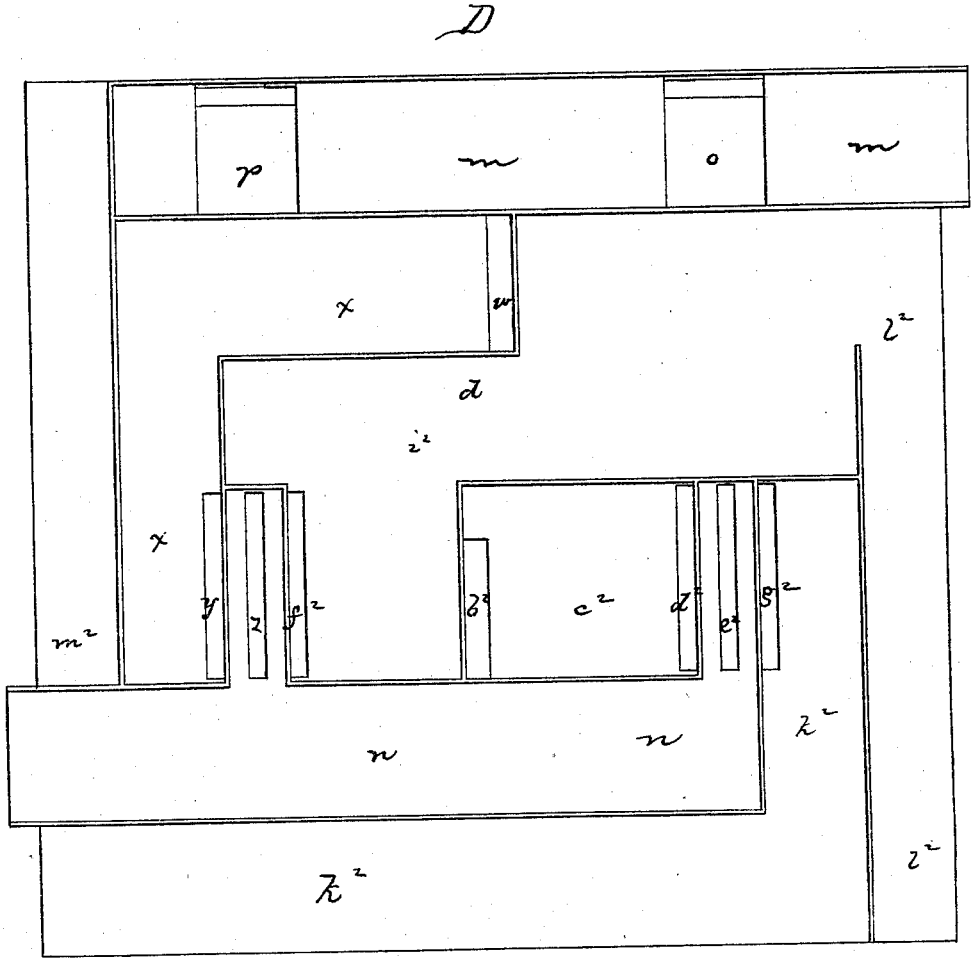
Witnesses:
S. B. Kidder
M. W. Frothingham
Inventor:
William O. Wakefield.
By his Attys.
Crosby & Gould

UNITED STATES PATENT OFFICE.

WILLIAM O. WAKEFIELD, OF BOSTON, MASSACHUSETTS.

IMPROVEMENT IN WATER-METERS.

Specification forming part of Letters Patent No. 130,610, dated August 20, 1872.

*To all whom it may concern:*

Be it known that I, WILLIAM O. WAKEFIELD, of Boston, in the county of Suffolk and State of Massachusetts, have invented an Improved Water-Meter; and I do hereby declare that the following, taken in connection with the drawing which accompanies and forms part of this specification, is a description of my invention sufficient to enable those skilled in the art to practice it.

The invention relates to the construction of piston-meters for measuring water. In my invention I make the meter with two double-headed reciprocating pistons in the same axial line, said pistons working in a cylinder or chamber between which and the main shell or case is a concentric chamber or space divided by partitions into a series of water-passages, which communicate by respective ports with the respective piston-chambers. Extending across the center of the piston-space is a partition or center-head which divides the space into two compartments or piston-chambers, (entirely separated by the partition,) one at each end of the meter, and at each end of the meter is a double or hollow cap or head, made with an end-opening extending into the chamber in the head, which chamber, by a suitable port, communicates with a long port-passage between the piston-chamber and outer case, which passage extends nearly to the opposite end of the meter. One of the heads is an inlet-head, its chamber and port communicating with the long inlet-port passage referred to for entrance of the water to the meter, and the other is an outlet-head, into the chamber of which the other port-passage opens for discharge of the water. The invention consists primarily in the arrangement of the respective water ports and passages, by which water enters the inlet-head and, passing into the main port-passage, (the meter being full,) passes first through one opening from said passage into one piston-chamber between the heads of the piston, and from said chamber through a port into a passage that directs it into the opposite piston chamber behind the piston thereof, or between the piston and the center-head, its pressure forcing said piston toward the outer end of its chamber, the water filling the space behind the piston. This movement of the last piston causes a valve which moves with it to uncover a port by which passage is opened for the inlet water passing into the chamber of said piston between the piston-heads to pass from said chamber through a port into a water-passage that conducts it to the chamber of the first piston between the piston and the center-head. While the second piston moves outward the water, between its outer head and the adjacent head of the meter, flows through a circular passage next to said meter-head, back through a long passage into a port covered by the D-valve of the other or first piston, out through an adjacent port covered by the same valve into a long outlet-passage to the adjacent meter-head through a port into the chamber of said head, and out through the meter-outlet. This leaves the first piston against the center-head and the second against the outer meter-head, and the movement of the valve of the second port with the piston uncovers the inlet-port so that the inlet-water now passes through the second piston-chamber between its heads out into a passage communicating by a port with the space behind the first piston forcing said piston toward the outer end of its chamber, the water in the outer end of said first piston-chamber (between the piston and the meter-head) passing through the circular passage adjacent to said head with a long passage communicating with a port covered by the valve of the other cylinder, from which port it passes to and through an adjacent port covered by the same valve, into the long outlet-passage; thence into the chamber of the outlet-head and out from the meter. The completion of the outward movement of the first piston carries its valve into position by which it uncovers another port to the inflowing water, the water passing through said port to a passage leading to the circular passage at the opposite end of the meter, which passage communicates with the chamber beyond the outer head of the second piston, the pressure of the water forcing the piston toward the center, the water between the opposite head of the piston and the center-head passing through the port adjacent to the center-head; thence by a water-passage to a port covered by the D-valve of the first piston, into and through said port to and out through the adjacent port (covered by the said valve)

into the outlet-passage; the same result next taking place with the other piston-cylinder.

The drawing represents a meter embodying my invention.

A shows a plan of the meter, the outer case being removed. B is a reversed plan, under the same circumstances. C is a vertical section of the meter. D is a view showing the ports and passages reduced to a plane. E is a cross-section through one of the valve-chambers. $a$ denotes the main cylinder or case; $b$, the inlet-head; $c$, the outlet-head; $d$, the inner or piston-case, composed of two piston-chambers, $ef$, separated by a center partition, $g$. Each head $b\ c$ is made double or with a chamber, from or into which extends a center-opening, $h$ or $i$, and a port, $k$ or $l$, the latter port in each head communicating with a passage, $m$ or $n$. Between the two tubular cylinders or cases $a\ d$ is a space divided by longitudinal and lateral partitions into a series of water-passages, which, respectively, and by respective ports or openings, communicate with the respective chambers in the piston-cylinders. $m$ denotes one of these passages, opening from the inlet-port $k$ of the inlet-head $b$, and, by two inlet-ports, $o\ p$, opening into the respective spaces between the heads of the two pistons. $n$ denotes another of said passages, opening from two ports under two valves of the pistons, and into the port $l$ of the outlet-head $c$, the passage $m$ being always the inlet-passage from each piston-chamber, and the passage $n$ always the outlet-passage from both piston-chambers. $r$ and $s$ denote the two pistons, each having two heads, with a water-space, $q$ or $q^2$, between them, and each having a D-valve, $t$ or $u$, between the heads. In each piston-chamber there are, in effect, three water-spaces, one between the inner head of the piston and the center head or cross-partition of the meter; one between the piston-heads, and one between the outer piston-head and the adjacent meter-head, the space between the heads being a valve-chamber and a water-inlet passage or conduit, and each of the other spaces a water receiving and measuring chamber. Between the inner head of one piston and the center partition is a space, $v$, communicating, by a port, $w$, with a passage, $x$, which passage $x$, by a port, $y$, opens into the space under the D-valve $u$ when the port $y$ is not covered by the valve-face, said port communicating, by a port, $z$, with the outlet-passage $n$. Between the inner head of the other piston and the center partition is a similar space, $a^2$, communicating, by a port, $b^2$, with a passage, $c^2$, which, by a port, $d^2$, opens into the space under the D-valve $t$,—when said port $d^2$ is not covered by the valve-face—said port communicating, by a port, $e^2$, with the outlet-passage $n$. When the face of either valve covers the inlet-port $y$ or $d^2$ the other port $z$ or $e^2$ communicates with another port, $f^2$ or $g^2$, opening into a passage, $i^2$ or $k^2$, one of which passages extends to and opens into a circular passage, $l^2$, adjacent to the opposite meter-head, and opening into the measuring-chamber $x^2$ at the outer end of the piston $r$, while the other passage $k^2$ opens into a similar passage, extending to and opening into a circular passage, $m^2$, adjacent to the other meter-head, and opening into the water-measuring chamber $y^2$ at the end of the pistons, each passage $l^2\ m^2$ opening into the piston-chamber or the adjacent space between the outer piston-head and the meter-head, there being, preferably, always a space between such heads, the piston-head not touching the meter-head on its out-stroke, being kept therefrom by a suitable projection. This constitutes the arrangement of the parts, and the operation of the meter is as follows:

Suppose the piston $r$ to have completed its inward stroke, and the piston $s$ to have completed its inward stroke, and the meter to be full of water. The water entering the meter will pass through the inlet-passage $m$, and through the opening $p$, into the piston-chamber $q^2$, between the piston-heads, through said chamber, out through the port $y$, into the passage $x$, to and through the port $w$, to the space $v$ behind the piston $r$—or between the inner head of piston $r$ and the center head $g$—and will move said piston outward, the piston $s$ remaining stationary. In the outward movement of the piston $r$ the water between its outer head and the adjacent meter-head in chamber $x^2$ will pass into the circular passage $l^2$, through the passage $i^2$, to and through the port $f^2$, under the D-valve $u$, to and out through the adjacent port $z$, to the outlet-space $n$, through said space into the chamber of the outlet-head $c$, out of the meter. The piston $s$ remains stationary until the piston $r$ completes its outward stroke, which movement of the piston $r$ opens the port $d^2$ beneath its valve, and the inlet-water can then pass into inlet-opening $o$, through the space $q$, between the heads of the piston $r$, through the port $d^2$, through which it passes into the water-passage $c^2$, through the port $b^2$ to the chamber $a^2$ between the inner head of the piston $s$ and the center partition, the piston $r$ remaining stationary. The pressure of the water then forces the piston $s$ outward and fills the chamber $a^2$ behind it, the water in the outer chamber $y^2$ of piston $s$ passing into and through the circular passage $m^2$, through the passage $k^2$ toward the opposite end of the meter, to the port $g^2$, through which it passes into and through the adjacent port $e^2$ into the outlet-passage $n$, from which it escapes through the outlet-head, as did before it the water from the other piston-chamber, the ports $g^2\ e^2$ under the D-valve $t$ being brought into communication by the position into which said valve is brought by the outward movement of the piston to which the valve is attached. Each piston is now at the completion of its outward stroke. The position of the piston $s$ leaves $f^2$ open to the inlet water, and the water passes through the inlet $p$, piston-chamber $s$, port $f^2$, passage $l^2$ to chamber $x^2$ at the end of the piston $r$, and starts said piston inward, the water behind the piston $r$ passing out through the end-port $w$, through passage $x$ to port $y$, through port $y$ into and out of adjacent port $z$ to outlet $n$, and from the meter. The completion of the inward stroke of the piston $r$ brings its port $g^2$ into position for passage of inlet water through the inlet $o$, and piston-chamber $q$ through the port $g^2$, from whence through passage $k^2$ it passes to passage $m^2$ to the chamber $y^2$ in front of the piston $s$, its pressure forcing piston $s$ inward, the water between piston $s$ and the center-head escaping through the port $b^2$, passage $c^2$, ports $d^2$ $e^2$, into outlet passage $n$, and from the meter, the same movements of the respective pistons alternately continuing so long as the passages are open for flow of water through the meter, each piston remaining stationary while the other piston moves, and each moving outward and then stopping until the other has moved outward, and the second then stopping until the first has moved inward, and the first then stopping until the second has moved inward, the first then again moving outward, and so on.

In constructing the meter I prefer to cast the outer cylinder of iron with the passage-forming ribs or partitions, and then to use a brass tube for the inner cylinder, cutting in said tube the respective ports.

It will be seen from the description that each piston-cylinder has two water receiving and measuring chambers, one of which chambers is supplied with inlet water passing through the valve-chamber of the other cylinder when the piston of said cylinder is at the end of its stroke in one direction, and the other of which chambers is supplied with inlet water through the said valve-chamber when the said piston is at the completion of its stroke in the other direction, all three chambers of each cylinder being in axial line, and also in axial line with the three chambers of the other cylinder. The relative arrangement of the various water-passages between the outer and inner cylinders may be modified from the specific arrangement shown, and I have made several such modifications, the arrangement of the ports with respect to the pistons being the same, as shown.

I claim—

1. The construction and arrangement of the two piston-cylinders, each with a water-measuring space at each end and a piston between, said piston having a valve-chamber between its heads, which chamber is the inlet for entrance and passage of water to the measuring-chambers of the opposite cylinders.

2. The arrangement of the measuring-chambers $y^2$ $a^2$ $v$ $x^2$, and inlet supply or valve chambers $r$ $s$, all in axial line, substantially as shown and described.

WILLIAM O. WAKEFIELD.

Witnesses:
FRANCIS GOULD,
S. B. KIDDER.